J. MILLER.
Harvester-Rakes.
No. 156,854.
Patented Nov. 17, 1874.
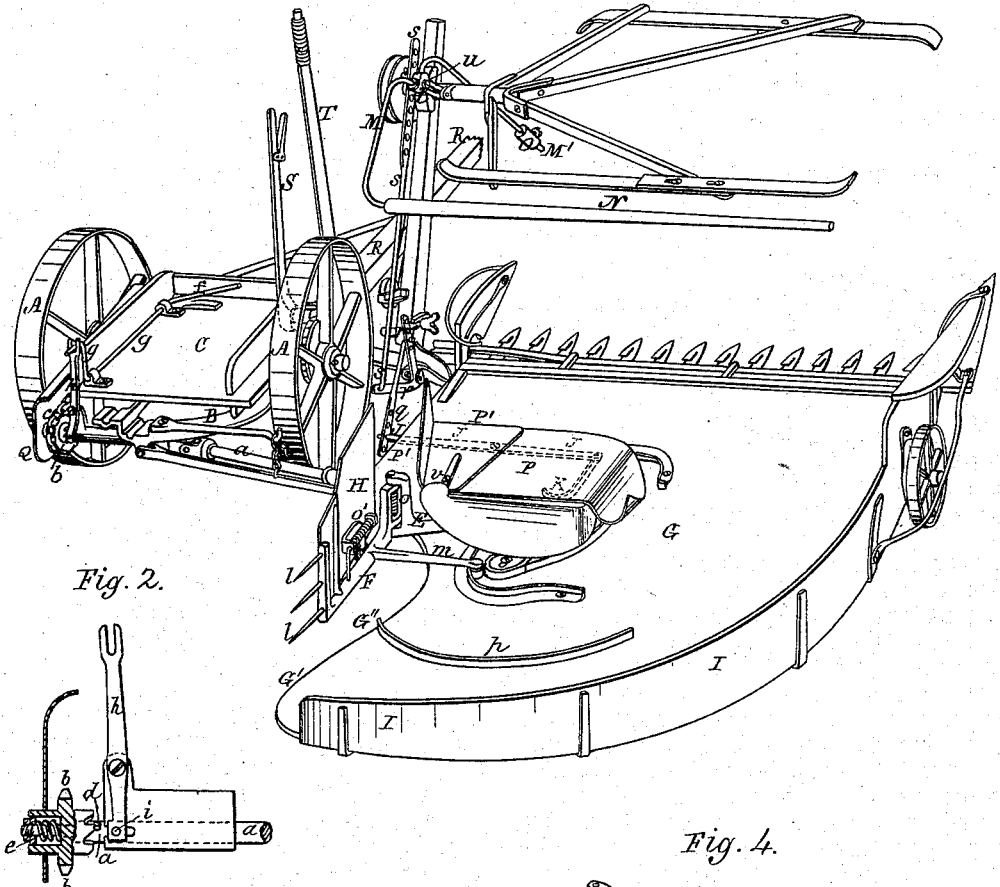
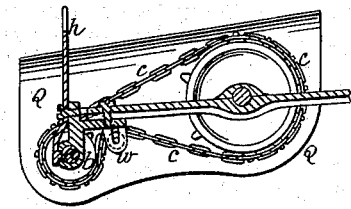
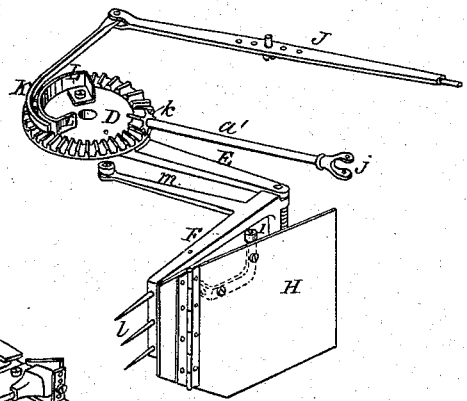
Witnesses.
W. E. Chaffee
E. Masson
Inventor.
Jacob Miller
By atty A. B. Stoughton.

UNITED STATES PATENT OFFICE.

JACOB MILLER, OF CANTON, OHIO.

IMPROVEMENT IN HARVESTER-RAKES.

Specification forming part of Letters Patent No. 156,854, dated November 17, 1874; application filed August 31, 1874.

*To all whom it may concern:*

Be it known that I, JACOB MILLER, of Canton, in the county of Stark and State of Ohio, have invented certain new and useful Improvements in Harvesting-Machines; and that the following is a full, clear, and exact description of the same, reference being had to the accompanying drawings, making a part of this specification, in which—

Figure 1 represents a perspective view of so much of a harvesting-machine as will illustrate my invention. Figs. 2, 3, 4, and 5 represent detailed parts of the machine, which will be hereinafter more particularly referred to.

My invention relates to certain devices or mechanisms by which the rake-driving shaft shall be locked when it is unclutched from the driving power, so as to stop the motion of the rake positively and at a fixed point. It further relates to certain devices or mechanisms for operating the cut-off automatically from the rake-driving gear, by which means it is more perfectly timed in relation to the rake with which it works. It further relates to a shield-plate and adjustable friction-pulley thereon near the chain-wheel, for the purpose of keeping back the slack of the driving-chain, and also for keeping the driving-chain on the drive-wheel or chain-wheel. It further relates to the combination, with an automatic cut-off operated from the rake or fork gear, of a counterpoise for balancing the weight of the cut-off.

To enable those skilled in the art to make and use my invention, I will proceed to describe the same with reference to the drawings.

The usual driving and supporting wheels are seen at A A, the main frame at B, and the platform on which the driver's seat is placed at C. To the rear of the main frame B (better seen in Fig. 2,) is hung the rake or fork driving shaft $a$, and upon this shaft is loosely hung the chain-wheel $b$, over which the chain $c$, that drives the rake or fork, runs. The hub of the chain-wheel $b$ is notched, and a stud or pin, $d$, is placed in the shaft $a$, so as to project from it at diametric points, and a spring, at $e$, forces the chain-wheel up, so that its notched portion will take in said stud or pin, and then the chain-wheel is clutched to and turns the rake-driving-shaft $a$. On the platform C there is a treadle, $f$, on the end of a crank-rod, $g$, the rear end of which crank-rod sets in a slot in the upper end of the pivoted clutch-lever $h$. In the lower end of the clutch-lever there is a pin or stud, $i$, which, when said clutch-lever is moved to unclutch the chain-wheel $b$, catches against the stud or pin $d$ in the drive-shaft, and instantly stops and locks the drive-shaft, which, otherwise by its momentum, would carry the rake or fork far beyond the point where it was desired to stop it. The rake or fork driving shaft $a$ is connected by a toggle-joint, at $j$, Fig. 4, to a shaft, $a'$, upon the end of which there is a bevel-pinion, $k$, that gears into and turns the rake or fork driving gear D, to which is attached the arm E, so as to revolve with said gear. To the end of the arm E is hinged the rake or fork arm F, which carries the fingers or tines $l$. This rake-arm F is controlled in its circuit by a tail-piece, $m$, that has a friction-roll in its end, and which runs against or between camways or ledges on the grain-table G, said roll being constantly held to said camways by a reactionary spring, $o$, at the hinged connection between the two arms. The fork $l$ is permanently united to the fork-arm F, but the palm H back of the fork is hinged thereto, so that it may change its inclination in relation to the fork to deliver the gavel in better position and in a compact form. For this purpose there is a small friction-roll, 1, Fig. 4, on the bottom of the palm H, which, when the fork is about to deliver the gavel on the ground, takes against the rear side of the camway $p$ on the grain-table, and moves said palm in the direction of the camway $p$, so that the gavel will be delivered in compact form at the point G' of the grain-table; whereas, without the hinged palm and camway to guide it, the gavel, in a less compact form, would be delivered at about the point G'' of said grain-table. The palm by its operation crowds and holds the gavel against the fence I until it is delivered at the edge of the grain-table, and hence it is in compact form. Without the hinged palm the gavel would not be compact.

Under the grain-table there is pivoted a swinging bar, J, Fig. 4, also seen in dotted lines in Fig. 1, to one end of which is connected a curved or cam arm, K, that is struck by a segment, L, fast on the rake-driving gear D, and causes said bar J to vibrate upon its pivot. The other end of said bar J passes into an eye in the end of a connecting-rod, $q$, which, in turn, is hooked into one arm of a bell-crank lever, $r$, and from the other arm of said bell-crank a connecting bar or rod, $s$, extends up to and is united to an adjustable piece or block, $t$, on the shank M of the cut-off N, and the shank M, though pivoted at $u$ to the reel-shaft support, extends beyond said pivoted point, as at M', and has upon this extended portion of it a sliding weight, O, for balancing the cut-off N, which is on the other side of the pivot at $u$. These several connecting parts can all be made adjustable, so that the time as well as the height or distance downward that it is desirable that the cut-off should go can be adjusted to a nicety by changing the leverages of the parts or other adjustments. Over the rake or fork-driving gear D, and over the rake-arm E, there is a shield, P, to keep the straw from the moving parts under it, the portion P' of which shield is pivoted at $v$, so that it may be moved to one side by the rake-arm E to allow the fork and palm to pass; and, when the rake-arm passes beyond said hinged portion P', it is immediately returned to its proper position by the reaction of a spring underneath itself. There is a shield, Q, placed between the carrying-wheel, on the stubble side of the machine, and the endless driving-chain $c$, more distinctly seen in Fig. 3, said shield being designed to prevent said wheel from carrying and throwing over upon the drive-chain and its co-acting chain-wheels material that would interfere with or clog its action. Upon this shield Q, and near the chain-wheel $b$, is adjustably arranged and supported a friction-wheel, $w$, which not only keeps back the slack of the driving-chain, but also causes said chain to have a greater extent of circumferential contact with the chain-wheel $b$, and thus performs the double duty of preventing the chain from slipping off from its wheel, and of having greater frictional contact therewith. The machine is raised or lowered upon the pole R by means of a pivoted lever, S, the pole and lever each having a cogged segment upon them that work into each other, and so materially facilitate the raising and lowering. There are many other parts of the machine shown in the drawings which it is not deemed necessary to describe particularly, as they do not enter specially into the claims herein made, but are necessary to the operation of a perfected machine in the field.

When the machine is converted into a mower, the reel, grain-table, and cutting apparatus, as shown in Fig. 1, are removed; and the finger-bar and its appliances, as shown in Fig. 5, as will be described, and the same or another sickle are put on in their stead or place. In this mowing attachment I use as soles or runners underneath the shoes the pieces $x\ x$, extending some distance back of the heels of the shoes, so that in tipping up the points of the guards or raising the cutting apparatus these soles or runners will rock upon the ground, and hold up said guards or cutting apparatus while they ride upon said soles. The tipping or rocking up device instead of being soles or runners, as shown, but which I prefer, may be a wheel or roller, as at $y$, though, by preference, arranged on the inside instead of the outside of the inside shoe, and upon an arm or projection attached to said shoe. The lever T, Fig. 1, is for raising and lowering the cutting apparatus, and is furnished with the usual segment, chain, and locking-bolt, and notched holder in the usual well-known way. As the palm H is moved upon its hinge, by the roller 1 and cam-ledge $p$, it coils up a spring at $o'$, so that whenever the roller leaves the cam-ledge the spring, by reacting, restores the palm to its original working position.

Having thus fully described my invention, what I claim therein as new, and desire to secure by Letters Patent, is—

1. In combination with the fork-driving shaft $a$ and the chain-wheel $b$, the pins in the clutch-lever and in the shaft, so that when the chain-wheel is unclutched the shaft shall cease to run, and be locked against moving by said pins, as and for the purpose described and represented.

2. In combination with the cut-off and the fork-driving gear, the segment or cam on said gear, the bent bar K, and its adjustable connections with the cut-off, so that said cut-off shall be worked from said drive-gear, and be accurately timed with the movement of the fork or rake, so as to alternate with it in taking the grain, as described and represented.

3. In combination with the shield Q, interposed between the drive-wheel, and the chain and chain-wheels, the friction pulley or wheel $w$, as and for the purpose described and represented.

4. In combination with the cut-off N, worked automatically from the fork-driving gear D, the counterpoise O, and arm M', for balancing and facilitating the rising and falling of the cut-off, substantially as described.

JACOB MILLER.

Witnesses:
L. A. JACKSON,
JNO. M. WELLS.